(12) United States Patent
Chu et al.

(10) Patent No.: US 9,600,581 B2
(45) Date of Patent: Mar. 21, 2017

(54) PERSONALIZED RECOMMENDATIONS ON DYNAMIC CONTENT

(75) Inventors: Wei Chu, Santa Clara, CA (US); Seung-Taek Park, San Jose, CA (US)

(73) Assignee: YAHOO! INC., Sunnyvale, CA (US)

( * ) Notice: Subject to any disclaimer, the term of this patent is extended or adjusted under 35 U.S.C. 154(b) by 746 days.

(21) Appl. No.: 12/388,941

(22) Filed: Feb. 19, 2009

(65) Prior Publication Data

US 2010/0211568 A1 Aug. 19, 2010

(51) Int. Cl.
*G06F 17/30* (2006.01)

(52) U.S. Cl.
CPC .............................. *G06F 17/30867* (2013.01)

(58) Field of Classification Search
CPC ........... G06F 17/30867; G06F 17/3069; G06F 17/30029; G06F 17/3061; G06F 17/30041; G06F 17/30044
USPC .................................. 707/732, E17.071, 748
See application file for complete search history.

(56) References Cited

U.S. PATENT DOCUMENTS

| | | | |
|---|---|---|---|
| 5,867,799 A * | 2/1999 | Lang et al. | |
| 5,999,975 A * | 12/1999 | Kittaka et al. | 709/224 |
| 6,029,161 A * | 2/2000 | Lang et al. | |
| 6,029,195 A * | 2/2000 | Herz | G06F 17/30867 |
| | | | 348/E7.056 |
| 6,308,175 B1 * | 10/2001 | Lang et al. | 707/608 |
| 6,438,579 B1 * | 8/2002 | Hosken | G06F 17/30867 |
| | | | 707/999.002 |
| 6,981,040 B1 * | 12/2005 | Konig et al. | 709/224 |
| 7,664,746 B2 * | 2/2010 | Majumder | 707/732 |
| 8,306,975 B1 * | 11/2012 | Eldering | 707/732 |
| 2002/0107853 A1 * | 8/2002 | Hofmann et al. | 707/7 |
| 2003/0033370 A1 * | 2/2003 | Trotta | G06F 17/30867 |
| | | | 709/204 |
| 2003/0177110 A1 * | 9/2003 | Okamoto | G06F 17/30867 |
| 2003/0195837 A1 * | 10/2003 | Kostic et al. | 705/37 |
| 2004/0068552 A1 * | 4/2004 | Kotz et al. | 709/218 |
| 2005/0055346 A1 * | 3/2005 | Perisic et al. | 707/3 |
| 2005/0071328 A1 * | 3/2005 | Lawrence | 707/3 |
| 2005/0076365 A1 * | 4/2005 | Popov et al. | 725/46 |
| 2006/0112079 A1 * | 5/2006 | Holt | G06F 17/30867 |
| 2007/0073723 A1 * | 3/2007 | Ramer | G06Q 30/02 |
| 2007/0112792 A1 * | 5/2007 | Majumder | 707/100 |
| 2008/0114732 A1 * | 5/2008 | Koike | G06F 17/30867 |
| 2008/0270151 A1 * | 10/2008 | Mahoney | G06Q 30/02 |
| | | | 705/1.1 |

* cited by examiner

*Primary Examiner* — Shiow-Jy Fan
(74) *Attorney, Agent, or Firm* — James J. DeCarlo; Greenburg Traurig, LLP (57) ABSTRACT

This disclosure describes systems and methods for selecting and/or ranking web-based content predicted to have the greatest interest to individual users. In particular, articles are ranked in terms of predicted interest for different users. This is done by optimizing an interest model and in particular through a method of bilinear regression and Bayesian optimization. The interest model is populated with data regarding users, the articles, and historical interest trends that types of users have expressed towards types of articles.

12 Claims, 2 Drawing Sheets

PERSONALIZED RECOMMENDATIONS ON DYNAMIC CONTENT

BACKGROUND

A challenge to many organizations is how to optimize the content served to clients and customers. In other words what is the proper content to serve and what is the proper time to serve that content? Personalized recommendations is one way to overcome the challenge. It involves collecting data regarding users and the content that they interact with. In some personalized recommendation systems, the user manually indicates his/her preferences. In other systems, user preferences are inferred from a history of user activity.

SUMMARY

This disclosure describes systems and methods for ranking articles. In an aspect of the disclosure a method is described that includes extracting user attributes from a static user profile. The static user profile has one or more user attributes for each of one or more users. The method further includes extracting content features from a content profile. There are one or more content features for each of one or more articles, and those one or more content features are dynamically updated. The method further includes forming an interest model. The interest model comprises the user attributes, the content features, and interest values. There is one interest value associated with each combination of one of the one or more user attributes and one of the one or more content features. The method further includes optimizing the interest model to form an optimized interest model by varying the interest values. Finally, the method includes returning a ranking of articles based on the optimized interest model.

In an aspect of the disclosure, one user attribute is common to all of the users. In another aspect of the disclosure, at least one content features is article quality. In another aspect of the disclosure, article quality is updated in real-time. In another aspect of the invention, article quality is based on an instantaneous click-through rate. In another aspect of the invention, each interest value represents an interest that users, having one of the user attributes, express towards articles having one of the content features. In another aspect of the disclosure, the initial interest values are used as the interest values prior to optimizing operation. In another aspect of the disclosure, the interest model comprises: a user vector for each user, wherein the user vector has a dimension 1 by D, and wherein D is a number of user attributes; a content vector for each article, wherein the content vector has a dimension 1 by C, and wherein C is a number of content features; and an interest matrix of dimensions C by D, wherein values of the interest matrix represent an interest for all combinations of user attributes and content features. In another aspect of the disclosure, the interest model is a bilinear regression model.

In an aspect of the disclosure, a system configured to rank articles is described. The system includes a user profile module configured to access user attributes. The system also includes a content profile module configured to access content features. The system also includes an interest value module configured to store interest values. The system also includes an interest model module. The interest model module is configured to extract the user attributes from the user profile, to extract the content features from the content profile, and to extract the interest values from the interest value module. The interest model module is also configured to populate an interest model with the user attributes, the content features, and the interest values. The system also includes an optimization module configured to optimize the interest model and form an optimized interest model. Finally, the system includes a ranking module. The ranking module is configured to form a ranking of articles based on the optimized interest model, and return the ranking of articles.

In an aspect of the disclosure a computer readable medium having computer code configured to instruct a computing system to operate or function in a specified manner is described. The computer code is configured to instruct a computing system to access user attributes stored in a static user profile, wherein there are one or more user attributes for each of one or more users. The computer code is configured to instruct a computing system to access content features stored in a content profile, wherein there are one or more content features for each of one or more articles, and wherein one or more content features are dynamically updated. The computer code is configured to instruct a computing system to populate an equation of an interest model, wherein the equation is populated with: the user attributes; the content features; and interest values, wherein there is one interest value associated with each combination of one of the one or more user attributes and one of the one or more content features. The computer code is configured to instruct a computing system to optimize the interest model to form an optimized interest model by varying the interest values of the equation. Finally, the computer code is configured to instruct a computing system to return a ranking of articles based on the optimized interest model.

In an aspect of the disclosure the equation of the computer readable medium is as follows:

$$s_{ij} = \sum_{a=1}^{C} \sum_{b=1}^{D} x_{i,b} z_{j,a} w_{ab}$$

In the equation, i represents a user; j represents an article, a represents a content feature; b represents a user attribute; C is a number of content features; D is a number of user attributes; $s_{ij}$ is a probability indicator related to the probability that the user i will be interested in an article j; $x_{i,b}$ is a value of the user i corresponding to whether or not the user i has a $b^{th}$ user attribute; $z_{j,a}$ is a value of the article j corresponding to whether or not the article j has an $a^{th}$ content feature; and $w_{ab}$ is an interest value, an entry of an interest matrix, wherein $w_{ab}$ represents the interest that users having the user attribute b express towards articles having the content feature a.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

DETAILED DESCRIPTION

This disclosure describes systems and methods for selecting Internet content to present to users. Traditionally, such systems require a user selection before they can optimize selections to match user preferences. Unfortunately this leaves such systems unable to provide tailored results to new users since there is no history for the system to analyze. The disclosed systems and methods overcome this challenge by basing the optimization algorithm on factors other than the particular user's content selection. As such, a new user without any history of content selection can receive articles tailored to that user.

The systems and methods can be applied to any content (e.g., articles, books, products, to name a few), and is not limited to Internet content. For instance, application to content on an intranet or a business database is also envisioned. For simplicity, and not as a limitation on the breadth of the disclosure, Internet articles are hereinafter described.

The system and methods first collect data about users and articles. Data can also be collected that assists in determining what types of users are interested in what types of articles. Data describing types of users will herein be referred to as user attributes. User attributes can include, for example, age, gender, submitted search queries, and browsed websites to name a few. Data representing types of articles will herein be referred to as content features. Content features can include, for example, article genre, title, type, or size, to name a few.

The collected data can be inserted into a model called an interest model. Inserting data into the interest model will herein be referred to as populating the interest model. The interest model can be optimized with interest values being the unknown or variable parameters. Regression, such as bilinear regression is one means to optimize the interest model. The interest model can also be optimized via a Bayesian mechanism. The optimized interest model can be used to create a ranking of articles that are likely of interest to specific users.

A particular content feature is article quality—sometimes referred to as dynamic article quality since it is regularly updated or refreshed (e.g., daily, hourly, every five minutes, or every minute, to name a few). For instance, while most content features and all user attributes can be updated on a weekly basis, article quality can be updated on a daily or hourly basis, for example. In an embodiment, article quality can be update in real-time or near-real-time (discussed later).

Figure 1:
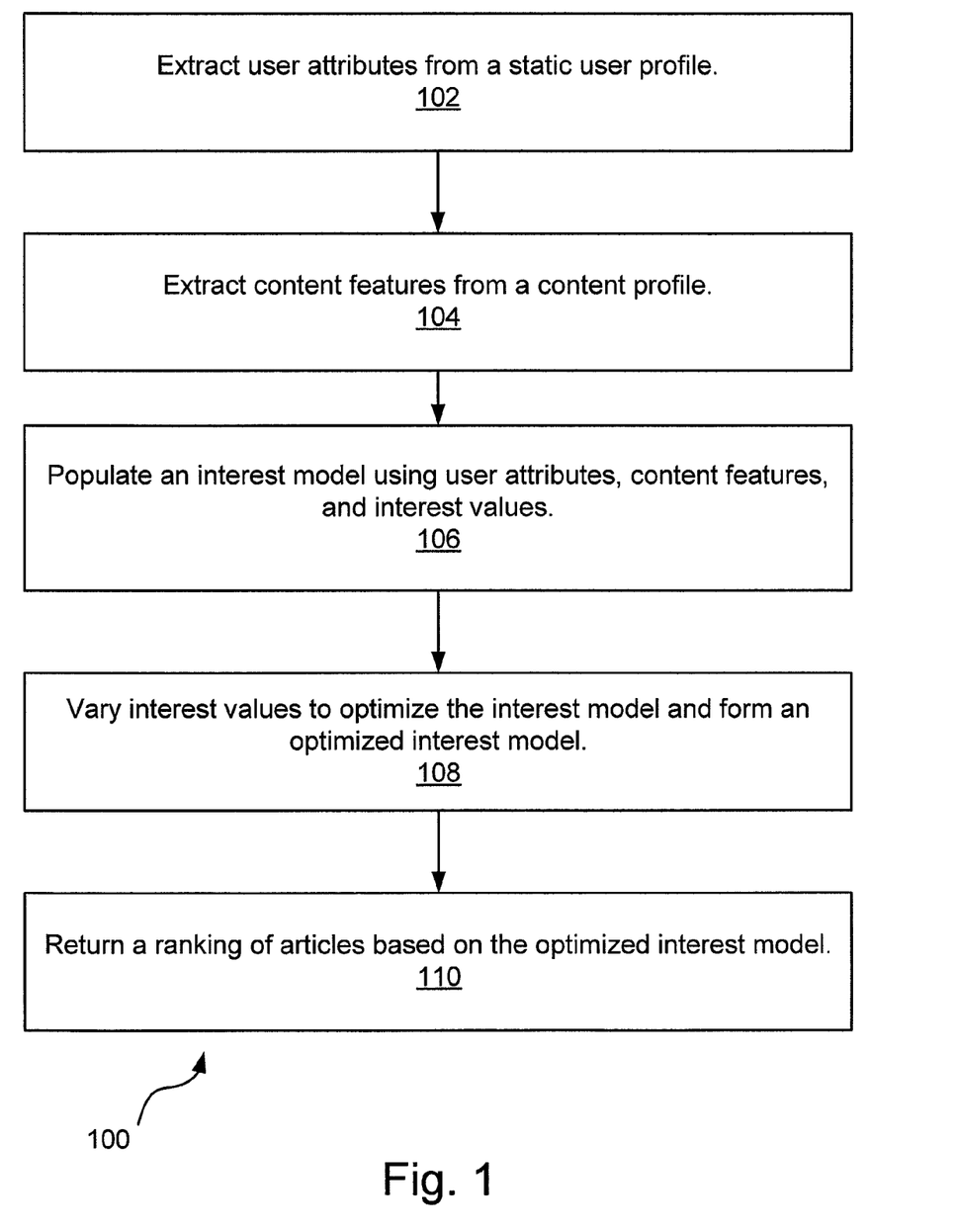
FIG. 1 illustrates one embodiment of a method for selecting Internet articles to present to users.

FIG. 1 illustrates one embodiment of a method for selecting Internet articles to present to users. The method 100 includes collecting data regarding users and collecting data regarding articles. This data, along with data representing different users' interests in different articles and types of articles, can be used to populate the interest model. The model can then be optimized to form an optimized interest model. The optimized interest model can be used to determine one or more rankings of articles, where each ranking is tailored to one or more unique users. This ranking can be utilized to present the most relevant articles to users.

Once data regarding a user, or user data, is collected, the method 100 can extract that data in a user attribute extraction operation 102. User data, or user attributes, can be stored in a static user profile residing on a computer readable medium. Thus, the user attribute extraction operation 102 can extract user attributes from a static user profile. The static user profile can be a data set associated with a user. User attributes can include, for example, age, gender, profession, geographic location, relationship status, tally of web pages browsed, preferred web pages, preferred products, type of advertisement most likely to influence this user, political preference, to name a few. User attributes can be inferred. For instance user entries into online mapping software or shipping address forms can indicate a user's geographic location. As another example, news websites that a user most often frequents can indicate political preference. At the same time, user attributes can be collected from raw data. For instance, a user may be prompted to enter user attributes such as age, gender, and salary. When user attributes indicate user preference (e.g., preference for expensive versus inexpensive products, preference for cloths over power tools, inclination to click on flashing advertisements versus static advertisements) they can be referred to as user preferences. User attributes are generally unchanging and thus need only be updated on a limited basis. As such, the user profile can be referred to as a static profile. In an embodiment, the user profile is not static. In an embodiment, there is at least a user attribute, and a value of that user attribute, common to all users. For instance, the user attribute could be termed, "common attribute", and have a value of 1 for all users.

Extracting data can mean transferring data from one location to another. For instance, user attributes can be extracted (transferred) from a user profile residing on a computer readable medium on a first remote server to the cache of the first remote server. As another example, user attributes can be extracted (transferred) from a user profile residing on a computer readable medium on a first remote server to a computer readable medium on the user's computer. Also, user attributes can be extracted (transferred) from a user profile residing on a first remote server's cache to the user computer's cache. Other combinations of original storage locations and transfer destinations should be apparent to one skilled in the art.

Extracting data can mean identifying the location of user attributes so that they can be extracted (transferred or accessed) at a later time. For instance, a remote server can identify the location in memory where certain user attributes are located, generate data identifying the user attribute location (identifying data), and use the identifying data at a later time to transfer the user attributes to a user computer.

Every user can have at least one user attribute. Often, there will be a plurality of user attributes for each user. A vector (user vector) or matrix (user matrix) can describe user attributes. In an embodiment, binary numbers can represent user attributes in a vector or matrix. For example, take two hypothetical users: A and B. In this example there are two user attributes: age and gender. The vector describing user A (34-year-old female) could appear as follows:

$$\begin{pmatrix} 0011 \\ 1 \end{pmatrix} \quad (1)$$

where the first row represent age and the second row represents gender. Here, there are ten age ranges spanning the ages 0 to 100. Each range can be represented by the binary form of the tens digit of the age range (e.g., 0-9=0=0000, 20-29=2=0010, 50-59=5=0101). There are only two gender options, so the second row is either a 1 (female) or a 0 (male). In the case of three gender options the second row could appear as 01 (female), 00 (male), 10 (other/unknown). The vector describing user B (51-year-old male) could appear as follows:

$$\begin{pmatrix} 0101 \\ 0 \end{pmatrix} \quad (2)$$

The matrix form of these two users and their two user attributes could appear as follows:

$$\begin{pmatrix} 0011 & 0101 \\ 1 & 0 \end{pmatrix} \quad (3)$$

In an embodiment, user attributes can be represented by vectors of ones and zeros. For instance, the user attribute of age could be represented as follows: 0-9 years-old=0=[000001]; 10-19 years-old=1=[000010]; 40-49 years-old=4=[010000], for example. However, it should be noted that any type, form, or combination of vectors or matrices can be used to represent user attributes. Embodiments are not to be limited to the illustrative examples presented herein.

Once data regarding an article, or article data, is collected, the method 100 can extract that data in a content feature extraction operation 104. An article is a web-based media element comprising text, images, video, and/or other media. Articles often appear on blogs, news web pages, product descriptions, or product reviews. Article data, or content features, can be stored in a content profile residing on a computer readable medium. Thus, the content feature extraction operation 104 can extract content features from a content profile. The content profile can be a set of data associated with an article. A content profile may describe one or more articles. Content features can include, for example, article type, article name, article category, article universal resource locator (URL), article size, or existence or absence of images or other media in an article, to name a few. Content features can be inferred. However, content features can also be obtained without need for inference. For instance, article title can be obtained via optical character recognition of the webpage or algorithms that scan webpage code.

Content features are sometimes unchanging and thus need only be updated on a limited basis. However, some content features, such as article quality, change temporally. As a result, dynamic, frequent, regular, real-time, or near-real-time updates are preferred. Thus, article quality can be referred to as dynamic article quality. For instance, user attributes and most content features may be updated on a weekly basis, whereas a content feature, such as dynamic article quality, may be updated every few seconds, every few minutes, or on a daily basis, just to name a few examples.

In an embodiment, article quality is updated in real-time. By real-time it is meant that updating occurs within a preset time of any article change. Real-time updates are also known as deterministic—there is no randomness introduced into the updating process. Updates will occur within a preset time period no matter what other variables or occurrences take place. Real-time updating can be accomplished in various ways. For instance, assuming the preset time is five minutes, article quality could be updated every five minutes. This would ensure that any article changes made in the last five minutes would be reflected in an updated article quality, and thus meet the requirement of real-time updating. Alternatively, updating could occur every three minutes, every four minutes, or any other periodic time that is less than or equal to the real-time preset time (five minutes in this example).

Other methods for ensuring real-time updating can also be implemented. For instance, rather than periodic updates, article quality could be updated in a non-periodic fashion, but again with the qualification that all articles are updated within a preset time (e.g., five minutes) to ensure real-time function.

In an embodiment, near-real-time updating can be implemented. In such an embodiment, updating need not always occur within a preset time. Rather, with near-real-time updates, articles can be updated within a preset time, but are not required to do so. This is also known as a non-deterministic method since updates do not always occur within a preset time. Such a system provides greater flexibility than a real-time system, yet still provides regular article updates.

Each user attribute and content feature can have different values. For instance, for gender (a user attribute) there can be a value representing male, female, and other/unknown. The content feature for title will have as many values as there are titles in memory. In an embodiment, content features can include values that represent more than one content feature. For instance, instead of just a value for male in the gender user attribute, the value could represent 30-year-old male. As another example, a content feature could include an article title and a genre (e.g., "Yeti Removes Woman's Bonnet" and News).

Every article can have at least one content feature. Often, there will be a plurality of content features for each article. Like user attributes, a vector (content vector) or matrix (content matrix) can describe content features. In an embodiment, binary numbers can represent content features in a vector or matrix.

Article quality is a content feature that is updated (refreshed) more frequently than other content features. As described earlier, article quality describes an estimated interest in an article or category of article. For instance, analysis of data regarding user activity on the Internet may indicate that a February 5 news article describing an emergency jetliner landing in downtown Las Vegas was a particularly popular article. As another example, product review articles can be found to be a category of article that is highly popular. The article, or category of article, would thus receive a high article quality.

The reason for rapid updating is twofold. First, articles, unlike user attributes such as age and gender, are often created, deleted, and/or changed. For instance, when surfing the web for news articles, some search engines present results along with time indicators showing how recent an article was published on the web (e.g., GOOGLE news results). Many of these articles have been published hours or even minutes prior. Thus, rapid updating or refreshing of dynamic article quality better captures new content, the removal of content, or changes in content. Second, the dynamic article quality (popularity of content) changes or decays with time. An article regarding the overdose death of a famous actor will be very popular within the first few hours or days, and then gradually or even quickly fall off. Rapidly updating dynamic article quality helps to capture this changing popularity and thus produce a ranking of articles that is more relevant to user interests.

In an embodiment, article quality can be determined from instantaneous click-through rate. Instantaneous click-through rate measures the popularity of a given website by dividing the number of users who click on a website or web page by the number of times that the web page or link to the web page was displayed. As noted previously, article quality can also be referred to as dynamic article quality.

While article quality has been herein described, the systems and methods can also apply to other forms of dynamic content.

Turning now to the interest model, it can be populated with the user attributes extracted from the static user profile, and with the content features extracted from the content profile. This is done via a populate interest model operation 106. Populating means to substitute values into the model. In an embodiment, the interest model can be a set of procedures used to optimize at least one equation. The at least one optimized equation can be used to predict a ranking of articles having the most interest to certain users.

In an embodiment, the interest model can include an equation having a dependent variable, at least one independent variable or static variable, and at least one unknown parameter. For instance, an equation used in a model could describe the distance traveled by a car and appear as follows: $x=r*t$, where r is the rate of travel, t is the time of travel, and x is the resulting distance traveled. The rate and time are input parameters and are either an unknown parameter or an independent variable. Since the distance depends upon the rate and time, it is a dependent variable. This equation could be part of a model for determining the distance traveled by various cars. The procedure would include populating the equation with rates of travel for each car, and with times of travel for each car. A series of distances traveled would be produced. In an instance where the rates for each car are unknown, the rate would be an unknown parameter. The times traveled would be known and thus be called the independent variable. Solving the model would simply involve solving for the unknown parameter, r, for each pair of distances, x, and times, t. More complex models can involve multiple equations, greater numbers of variables, and various methods of regression.

In an embodiment, the interest model can be an algorithm. In an embodiment, the interest model can be a set of equations. In an embodiment, the interest model can be a set of related or associated equations. In an embodiment, the interest model can be a program configured to run on a computer system. In an embodiment, the interest model can be computer code configured to execute on a computer system. In an embodiment, the interest model can comprise at least one static variable or fixed variable as well as at least one dynamic variable. For instance, one or more variables can represent user attributes. One or more variables can represent content features.

The interest model can have at least one interest value. Interest values represent user interest in different articles. There can be an interest value for every combination of user and article. One interest value is associated with each combination of the one or more user attributes and one of the one or more content features. Recall that each user attribute can be associated with a plurality of content features. As such, each content feature can be associated with a plurality of user attributes. Each of these combinations can further be associated with one interest value. This interest value represents the interest the users having the given user attribute will express towards an article having the content feature associated with the user attributes.

For instance, assume there are two user attributes, age and gender, where the age is 30 and the gender is female. Assume there are two content features, title and genre, where the title is "Monkeys Stage Coup" and the genre is news. Such a situation would correspondingly have four interest values, one for each combination of user attributes and content features as follows: (1) interest that 30-year-old users have towards the article entitled "Monkeys Stage Coup"; (2) interest that female users have towards the article entitled "Monkeys Stage Coup"; (3) interest that 30-year-old users have towards news articles; (4) interest that female users have towards news articles. In an embodiment, interest values can exist in matrix form. The matrix elements can be denoted $w_{ab}$, where a is a user attribute (age=1, gender=2), and b is a content feature (title=1, genre=2). For instance, the example just noted could exist as the following matrix:

$$\begin{pmatrix} w_{11} & w_{12} \\ w_{21} & w_{22} \end{pmatrix} \qquad (4)$$

Here, for example, element $w_{11}$ represents the interest value corresponding to the interest that 30-year-old users have towards the article entitled "Monkeys Stage Coup".

In an embodiment, the interest model is formed rather than populated. Forming includes using the user attributes extracted from the static user profile, the content features extracted from the content profile, and the interest values. Forming can include creating the equations and relations between equations in the interest model, rather than just populating them.

In an embodiment, one equation of the interest model has three variables: user attributes, content features, and interest values. In an embodiment, one equation of the interest model can include more or less than three variables. In an embodiment, one equation of the interest model can include variables other than user attributes, content features, and interest values. In an embodiment one equation of the interest model can be the following:

$$s_{ij} = \sum_{a=1}^{C} \sum_{b=1}^{D} x_{i,b} z_{j,a} w_{ab} \qquad (5)$$

where the variable i represents a user. For instance if there are three users, then i equals 1 for the first user, 2 for the second user, and 3 for the third user (alternatively, i could also be 0, 1, and 2 for the three users, respectively). The variable j represents an article. For instance if there are three articles, then j equals 1 for the first article, 2 for the second article, and 3 for the third article (alternatively, j could also be 0, 1, and 2 for the three articles, respectively). The dependent variable, or probability indicator, $s_{ij}$ is related to or can be transformed into the probability that a user i will be interested in an article j. The variable $s_{ij}$ is also known in the field as a weighted sum. The variable a represents a content feature. For instance, there could be three content features as follows: 31 to 40-year-old males, 41 to 50-year-old males, and males over 50. The variable C represents the number of content features. Thus, in the prior example C would equal three. The variable b represents a user attribute. For instance, there could be three user attributes as follows: news articles, sports articles, and product review articles. The variable D represents the number of user attributes. Thus, in the prior example D would equal three.

The independent variable $x_{i,b}$ is a value of the user i corresponding to whether or not the user i has a $b^{th}$ user attribute. Thus, for each user i there is an $x_b$ value for the $1^{st}$ through the $D^{th}$ user attribute b. If the user i has the $b^{th}$ user attribute, then the corresponding $x_{i,b}$ value is greater than zero. If the user i does not have the $b^{th}$ user attribute, then the corresponding $x_{i,b}$ value is equal to zero. The independent variable $z_{j,a}$ is a value of the article j corresponding to whether or not the article j has an $a^{th}$ content feature. Thus, for each content feature j there is a $z_a$ value for the $1^{st}$ through the $C^{th}$ content feature a. If the article j has the $a^{th}$ content feature, then the corresponding $z_{j,a}$ value is greater than zero. If the article j does not have the $a^{th}$ content feature, then the corresponding $z_{j,a}$ value is equal to zero. The unknown parameter $w_{ab}$ is an interest value, an entry of an interest matrix, wherein $w_{ab}$ represents the interest that users having a user attribute b express towards articles having a content feature a. Without regard to the user i or article j, there is a $w_{ab}$ value for every combination of user attributes b and content features a. The interest values are used to initially populate the interest matrix. Once optimization begins, the interest values in the interest matrix are modified. The independent variables $x_{i,b}$ and $z_{j,a}$ remain unchanged during optimization.

Equation 5 determines an $s_{ij}$ value for each user i and each article j. For each combination of a user i and an article j equation 5 sums the products of $x_{i,b}$ $z_{j,a}$ $w_{ab}$ for each combination of user attributes b and content features a. In other words, $s_{ij}$ is related to, or can be transformed into, a probability that a user i will be interested in an article j, and this probability is based off a plurality of user attributes, content features, and interest previously expressed by users having those user attributes and articles having those content features. The optimal value of $s_{ij}$, or best guess, is determined via the following equation:

$$s_{ij}^* = \sum_{a=1}^{C} \sum_{b=1}^{D} x_{i,b} z_{j,a} w_{ab}^* \qquad (6)$$

where $w_{ab}^*$ denotes the optimal interest values inferred from equation 12 (described below).

Once populated or formed, the interest model can be optimized in an optimize operation 108. The optimize operation 108 varies interest values to optimize the interest model thus generating an optimized interest model. In an embodiment, user attributes and content features are static variables (also known as independent variables, static parameters, fixed parameters, and/or unchanging parameters). However, interest values can be altered or changed during the optimization process. For instance, if the interest model is optimized via regression, then on each regression loop, the interest values will be altered in an attempt to hone in on an optimized interest model.

In an embodiment, optimization is performed via bi-linear regression. In an embodiment, optimization is performed via an iterative process or an iterative analysis. The interest values that are first used to populate the interest model can thus be considered initial guesses. In other words, the interest values are a starting point from which the interest model can then move forward with the optimization process. The interest values in the optimized model will generally be different than the interest values used to populate or form the interest model. In an embodiment where user vectors, content vectors, and an interest matrix are used, the interest model can be iteratively optimized in order to determine or solve for an optimized interest matrix.

The optimized interest model is a model able to predict articles that are most likely to be of interest to certain users. In other words, the optimized interest model is able to predict which types of articles, or articles having certain content features, will be most likely to be of interest to certain users, or users having particular user attributes. This is what $s_{ij}$ is related to in equation 5. It's related to the probability that a user i will be interested in an article j.

The following describes one embodiment of an interest model and the procedure that the model uses for optimization. Optimization uses Bayesian probability. The end goal is a set of $s_{ij}$ values, each indicating what articles different users will be most interested in. The model comprises a number of equations, and within these equations two parts are to be simultaneously minimized. The first minimization is between the probability indicator $s_{ij}$ and an observed targets or ratings indicator $r_{ij}$. The second minimization is of the square of the interest values $w^2_{ab}$.

In an embodiment, the magnitude of the difference between the probability indicator $s_{ij}$ and an observed targets or ratings indicator $r_{ij}$ (interactive data, observational data) can be minimized via least squares as follows:

$$(r_{ij} - s_{ij})^2 \qquad (7)$$

To minimize the difference between the observed targets or ratings indicator $r_{ij}$ (interactive data, observational data) and the probability indicator $s_{ij}$, a first function can be defined as:

$$p(r_{ij} \mid s_{ij}) = \frac{1}{\sqrt{2\pi}\,\sigma} \exp\left(-\frac{(r_{ij} - s_{ij})^2}{2\sigma^2}\right) \qquad (8)$$

where σ stands for a noise level. Noise represents users selecting articles that they are not interested in or users failing to see articles that they were interested in. The noise value can be derived from knowledge regarding user interaction, or lack thereof, with articles. Alternatively, noise can be inferred via Bayesian computation. In practice, the noise level can be prefixed at an appropriate value based on the signal to noise ratio. The observed targets or ratings indicator $r_{ij}$ is known. The ratings indicator $r_{ij}$ can be interactive data. It represents whether or not a user i has selected an article j. The value of $s_{ij}$ is known since all variables/parameters in equation 5 are known: user attributes $x_{i,b}$ and content features $z_{j,a}$ are extracted from the static user profile and the content profile, respectively; interest values $w_{ab}$ are derived from previously expressed interest between users having certain user attributes and articles having certain content features.

In an embodiment, a binary target, as follows, can be used instead of that defined in equation 8:

$$p(r_{ij} \mid s_{ij}) = \frac{1}{1 + \exp(-r_{ij} s_{ij} + \gamma)} \qquad (9)$$

where the parameter γ is a bias term usually set equal to one. In other words, equations 8 and 9 are interchangeable, although the results of using one versus the other will not be the same.

Given a set of interest values $w_{ab}$, which can be denoted as w, the likelihood of observing the ratings indicator (interactive data, observational data) can be evaluated by the following equation:

$$p(O \mid w) = \prod_{ij} p(r_{ij} \mid s_{ij}) \qquad (10)$$

where ij runs over the interactive data (observational data) $O$.

Here, equation 8 or equation 9 is substituted into the right side of equation 10. Equation 10 will be referred to as the "likelihood".

To minimize the square of the interest values $w^2_{ab}$, a "prior distribution" is defined as follows:

$$p(w) = \frac{1}{\sqrt{2\pi}\,\varsigma} \exp\left(-\frac{\sum_{ab} w^2_{ab}}{2\varsigma^2}\right) \quad (11)$$

were, $\varsigma^2$ is the variance. To summarize, equation 11 is called the prior and is used to minimize the square of the interest values $w^2_{ab}$. Equation 10 is called the likelihood and is used to minimize the difference between the observed ratings or targets $r_{ij}$ (interactive data, observational data) and the probability indicator $s_{ij}$.

The product of equations 10 and 11 is an "objective function" as follows:

$$p(w|\mathbb{O}) \propto p(\mathbb{O}|w)p(w) \quad (12)$$

Another way to describe equation 12 is that the product of equations 10 and 11 is proportional to a "posterior distribution of w".

In an embodiment, the optimal values of $w_{ab}$, denoted $w_{ab}^*$, maximize the left side of equation 12, and in doing so minimize both the square of the interest values $w^2_{ab}$ and the difference between the observed ratings or targets $r_{ij}$ (interactive data, observational data) and the probability indicator $s_{ij}$.

In an embodiment, on a particular set of observations for training, the corresponding posterior distribution of the weight coefficients can be computed. The weight statistics can be applied to new user item pairs for prediction. For any pair of $x_i$ and $z_j$, the predictive distribution of the probability indicator $s_{ij}$ is determined via the following equations:

$$s^*_{ij} = \sum_{a=1}^{C} \sum_{b=1}^{D} x_{i,b} z_{j,a} E[w_{ab}] \quad (13)$$

where, $E[\cdot]$ stands for the expectation of the interest values $w_{ab}$ over the posterior distribution of w (the left side of equation 12).

Now that a specific embodiment of the interest model has been described, a description of the ranking operation, made possible by optimizing the interest model, follows. A ranking of articles, sorted by the optimal probability indicators $s_{ij}^*$, can be based on the optimized interest model. The ranking can be provided to or returned to the user, or a system that requested a ranking of articles (ranked articles). This can be performed via the return a ranking of articles based on the optimized interest model operation 110. The return ranking operation 110 uses the optimized interest model to predict which articles, or which articles having certain content features, are most likely to be of interest to certain users, or those users having certain user attributes. The ranking of articles can be provided to a server, to the user, to the user's computer system, to a computer system associated with the user, or to a computer system accessible to the user.

Figure 2:
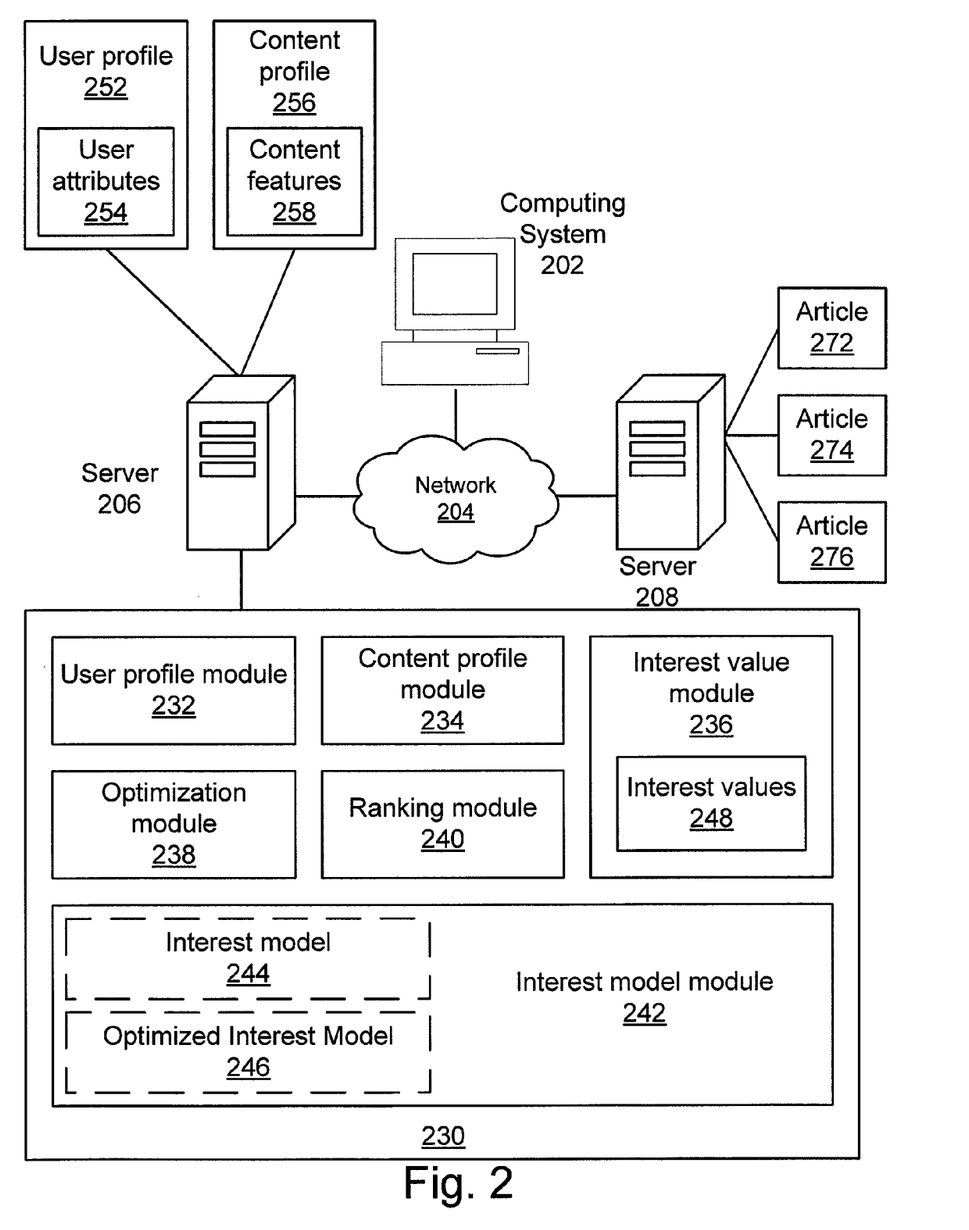
FIG. 2 illustrates a system configured to carry out the method illustrated in FIG. 1

FIG. 2 illustrates a system configured to carry out the method illustrated in FIG. 1 The system 230 can include a user profile module 232. The user profile module can be configured to access or extract user attributes 254. User attributes can be stored in a user profile 252. The user profile 252 can be stored on a first remote server 206. The first remote server 206 can be remotely accessible to a computing system 202. The computing system 202 can be configured to be operated by a user. A network 204 (for instance, the Internet or an intranet) enables communication between the first remote server 206 and the computing system 202. In an embodiment, the user profile 252 can reside on the computing system 202.

The system 230 can include a content profile module 234. The content profile module 234 can be configured to access or extract content features 258. Content features 258 can reside in a content profile 256. In an embodiment, the content profile 256 resides on the first remote server 206. In an embodiment, the content profile 256 resides on the computing system 202.

The system 230 can include an interest value module 236. The interest value module 236 can be configured to store interest values 248. In an embodiment, interest values 248 reside on the first remote server 206. In an embodiment, the interest values 248 reside on the computing system 202.

The system 230 can include an optimization module 238. In an embodiment, the optimization module 238 can reside on the first remote server 206. The optimization module 238 can be configured to optimize an interest model 244. The interest model 244 can reside on an interest model module 242. The interest model module 242 can reside on the system 230. The optimization module 238 can be configured to form or generate an optimized interest model 246 by optimizing an interest model 244. The interest model module 242 can comprise the interest model 244 and/or the optimized interest model 246. For instance, in an embodiment, the interest model 244 can be a starting point from which the optimization module 238 optimizes the interest model 244 in order to create the optimized interest model 246. In such an embodiment, the interest model 244 does not change; it retains its form in preparation for use in another cycle of the operations described above. In another embodiment, the interest model 244 can be replaced by an optimized interest model 246. In such an embodiment, the interest model 244 would be recreated or regenerated every time that a new optimization operation started (or slightly before).

The system 230 can include a ranking module 240. The ranking module 240 is configured to form, generate, or create a ranking of articles based on the optimized interest model 246. A plurality of articles 272, 274, 276 can reside on a second remote server 208. The second remote server 208 can be separate or isolated from the first remote server 206 and the computing system 202. The second remote server 208 can be in communication with either or both via the network 204. In an embodiment, the second remote server 208 and the first remote server 206 can be one and the same. The ranking can be a set of data residing on the first remote server 206 or on the second remote server 208. That ranking can be used to transfer the articles 272, 274, 276, or copies of the articles 272, 274, 276 to the computing system 202 in such a way that the articles 272, 274, 276 can be presented to the user in a ranked order. On the other hand, the ranking can be a description of the manner in which articles 272, 274, 276 are stored. The ranking module 240 is further configured to return the ranking of articles to either the first remote server 206 or the second remote server 208.

As previously noted, the system 230 comprises an interest model module 242. The interest model module 242 is configured to access or extract the user attributes 254 from the user profile 252. The interest model module 242 is also configured to access or extract the content features 258 from the content profile 256. The interest model module 242 is also configured to access or extract the interest values 248 from the interest value module 236. The interest model module 242 is also configured to populate the interest model 244 with the user attributes 254, the content features 258, and the interest values 248. The populated interest model 244 can be optimized by the optimization module 238 to form the optimized interest model 246.

For the purposes of this disclosure a computer readable medium stores computer data in machine readable form. By way of example, and not limitation, a computer readable medium may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

In an embodiment the network may be an intranet. An intranet is a computer network allowing data transfer between computing devices on a network that is only accessible within an organization. An intranet may comprise personal computers, mainframes, servers, network-enabled hard drives, and any other computing device capable of connecting to other computing devices via an intranet. An intranet uses the same Internet protocol suit as the Internet.

For the purposes of this disclosure a computing device or computing system includes a processor and memory for storing and executing program code, data and software. Computing devices may be provided with operating systems that allow the execution of software applications in order to manipulate data. Personal computers, PDAs, wireless devices, cell phones, internet appliances, media players, home theater systems, and media centers are several non-limiting examples of computing devices.

Various implementations of the systems and techniques described here can be realized in digital electronic circuitry, integrated circuitry, specially designed ASICs (application-specific integrated circuits), computer hardware, firmware, software, and/or combinations thereof. These various implementations can include one or more computer programs that are executable and/or interpretable on a programmable system including at least one programmable processor, which may be special or general purpose, coupled to receive data and instructions from, and to transmit data and instructions to, a storage system, at least one input device, and at least one output device. Such computer programs (also known as programs, software, software applications or code) may include machine instructions for a programmable processor, and may be implemented in any form of programming language, including high-level procedural and/or object-oriented programming languages, and/or in assembly/machine languages. A computer program may be deployed in any form, including as a stand-alone program, or as a module, component, subroutine, or other unit suitable for use in a computing environment. A computer program may be deployed to be executed or interpreted on one computer or on multiple computers at one site, or distributed across multiple sites and interconnected by a communication network.

Those skilled in the art will recognize that the systems and methods of the present disclosure can be implemented in many manners and as such are not to be limited by the foregoing exemplary embodiments and examples. In other words, functional elements being performed by single or multiple components, in various combinations of hardware and software or firmware, and individual functions, can be distributed among software applications at either a client or server or both. In this regard, any number of the features of the different embodiments described herein can be combined into single or multiple embodiments, and alternate embodiments having fewer than, or more than, all of the features described herein are possible. Functionality can also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that can be made to the hardware or software or firmware components described herein as would be understood by those skilled in the art now and hereafter.

While various embodiments have been described for purposes of this disclosure, such embodiments should not be deemed to limit the teaching of this disclosure to those embodiments. Various changes and modifications can be made to the elements and operations described above to obtain a result that remains within the scope of the systems and processes described in this disclosure. For instance, while this disclosure focused on tailoring articles to users on the Internet or an intranet, the systems and methods disclosed could also be used to tailor and present other content to users or systems. For instance, other content could include images, videos, or games, to name a few. While the articles described tend to be online articles, offline articles or other media could also be presented to users in a ranked order.

Numerous other changes can be made that will readily suggest themselves to those skilled in the art and which are encompassed in the spirit of the invention disclosed and as defined in the appended claims.

What is claimed is:

1. A method comprising:
   extracting, via a server computing device, user attributes from a static user profile, wherein there are one or more user attributes for each of one or more users in the user profile, said extraction of the user attributes comprising identifying the user attributes on a non-transitory computer-readable storage medium of a computing device hosting the static user profile, and transferring and storing information related to the user attributes in a cache of the server computing device;
   extracting, via the server computing device, content features from a content profile, wherein there are one or more content features for each of one or more articles in the content profile, and wherein one or more content features are dynamically updated, the content profile being a separately stored profile from the user profile, said extraction of the content features comprising identifying the content features on a non-transitory computer-readable storage medium of a computing device hosting the content profile, and transferring and storing information related to the content features in the cache of the server computing device;
   creating, via the server comprising device, a new interest model based on variables including the extracted user attributes, the extracted content features, and interest values, wherein there is one interest value associated with each combination of one of the one or more extracted user attributes and one of the one or more extracted content features, said creation of the interest model comprising determined relationships between created equations premised on the variables;

optimizing, via the server computing device, the interest model to form an optimized interest model by varying the interest values;

searching, via the server computing device, for an article; and returning, via the server computing device in response to said search, a ranking of articles based on the optimized interest model, said return of the ranking comprising analyzing results of said search and performing said ranking by applying said optimized interest model to said results.

2. The method of claim 1, wherein one user attribute is common to all of the users.

3. The method of claim 1, wherein at least one content features is article quality.

4. The method of claim 3, wherein article quality is updated in real-time.

5. The method of claim 4, wherein article quality is based on an instantaneous click-through rate.

6. The method of claim 1, wherein each interest value represents an interest that users having one of the user attributes express towards articles having one of the content features.

7. The method of claim 1, wherein initial interest values are used as the interest values prior to optimizing operation.

8. The method of claim 1, wherein the interest model further comprises:
a user vector for each user, wherein the user vector has a dimension 1 by D, and wherein D is a number of user attributes;
a content vector for each article, wherein the content vector has a dimension 1 by C, wherein C is a number of content features; and
an interest matrix of dimensions C by D, wherein values of the interest matrix represent an interest for all combinations of user attributes and content features.

9. The method of claim 1, wherein the interest model is a bilinear regression model.

10. A system comprising:
a processor;
a non-transitory computer-readable storage medium for tangibly storing thereon program logic for execution by the processor, the program logic comprising:
logic executed by the processor for extracting user attributes from a static user profile, wherein there are one or more user attributes for each of one or more users in the user profile, said extraction of the user attributes comprising identifying the user attributes on a non-transitory computer-readable storage medium of a computing device hosting the static user profile, and transferring and storing information related to the user attributes in a cache of the server computing device;
logic executed by the processor for extracting content features from a content profile, wherein there are one or more content features for each of one or more articles in the content profile, and wherein one or more content features are dynamically updated, the content profile being a separately stored profile from the user profile, said extraction of the content features comprising identifying the content features on a non-transitory computer-readable storage medium of a computing device hosting the content profile, and transferring and storing information related to the content features in the cache of the server computing device;
logic executed by the processor for creating a new interest model based on variables including the extracted user attributes, the extracted content features, and interest values, wherein there is one interest value associated with each combination of one of the one or more extracted user attributes and one of the one or more extracted content features, said creation of the interest model comprising determined relationships between created equations premised on the variables;
logic executed by the processor for optimizing the interest model to form an optimized interest model by varying the interest values;
logic executed by the processor for searching for an article; and
logic executed by the processor for returning, in response to said search, a ranking of articles based on the optimized interest model, said return of the ranking comprising analyzing results of said search and performing said ranking by applying said optimized interest model to said results.

11. A non-transitory computer readable storage medium tangibly encoded with computer-executable code, that when executed by a processor associated with a server computing system, performs a method comprising:
extracting user attributes from a static user profile, wherein there are one or more user attributes for each of one or more users in the user profile, said extraction of the user attributes comprising identifying the user attributes on a non-transitory computer-readable storage medium of a computing device hosting the static user profile, and transferring and storing information related to the user attributes in a cache of the server computing device;
extracting content features from a content profile, wherein there are one or more content features for each of one or more articles in the content profile, and wherein one or more content features are dynamically updated, the content profile being a separately stored profile from the user profile, said extraction of the content features comprising identifying the content features on a non-transitory computer-readable storage medium of a computing device hosting the content profile, and transferring and storing information related to the content features in the cache of the server computing device;
creating a new interest model based on variables including the extracted user attributes, the extracted content features, and interest values, wherein there is one interest value associated with each combination of one of the one or more extracted user attributes and one of the one or more extracted content features, said creation of the interest model comprising determined relationships between created equations premised on the variables;
optimizing the interest model to form an optimized interest model by varying the interest values;
searching for an article; and
returning, in response to said search, a ranking of articles based on the optimized interest model, said return of the ranking comprising analyzing results of said search and performing said ranking by applying said optimized interest model to said results.

12. The non-transitory computer readable storage medium of claim 11, wherein the equation is:

$$s_{ij} = \sum_{a=1}^{C} \sum_{b=1}^{D} x_{i,b} z_{j,a} w_{ab}$$

and wherein i represents a user,
and wherein j represents an article,
and wherein a represents a content feature,
and wherein b represents a user attribute,
and wherein C is a number of content features,
and wherein D is a number of user attributes,
and wherein $s_{ij}$ is a probability indicator related to the probability that the user i will be interested in the article j,
and wherein $x_{i,b}$ is a value of the user i corresponding to whether or not the user i has a $b^{th}$ user attribute,
and wherein $z_{ja}$ is a value of the article j corresponding to whether or not the article j has an $a^{th}$ content feature,
and wherein $w_{ab}$ is an interest value, an entry of an interest matrix, wherein $w_{ab}$ represents the interest that users having the user attribute b express towards articles having the content feature a.

* * * * *